United States Patent [19]

Crisler

[11] Patent Number: 5,257,402
[45] Date of Patent: Oct. 26, 1993

[54] METHOD FOR EFFECTING HANDOFF IN A MULTI-SITE COMMUNICATION SYSTEM

[75] Inventor: Kenneth J. Crisler, Wheaton, Ill.
[73] Assignee: Motorola, Inc., Schaumburg, Ill.
[21] Appl. No.: 676,991
[22] Filed: Mar. 28, 1991
[51] Int. Cl.[5] .............................................. H04Q 7/00
[52] U.S. Cl. ................................. 455/33.2; 455/54.2; 379/60
[58] Field of Search ................... 455/33.2, 33.4, 54.1, 455/54.2, 62, 34.1; 379/60

[56] References Cited

U.S. PATENT DOCUMENTS

| | | | |
|---|---|---|---|
| 4,856,048 | 8/1989 | Yamamoto et al. | 455/33.2 |
| 5,042,082 | 8/1991 | Dahlin | 455/33.2 |

FOREIGN PATENT DOCUMENTS

WO9100657  1/1991  PCT Int'l Appl. ................ 455/33.2

Primary Examiner—Reinhard J. Eisenzopf
Assistant Examiner—Andrew Faile
Attorney, Agent, or Firm—Steven G. Parmelee

[57] ABSTRACT

A method of effecting handoff of a communicating communication unit from a first communication resource to a second communication resource. After determining that a handoff from the first communication resource to the second communication resource should likely be made, the method makes determinations regarding relative levels of communication degradation that will likely occur when using different handoff methodologies to effect the handoff. In general, the method selects a particular handoff methodology that will provide a best level of handoff reliability while simultaneously posing at least no more than an acceptable level of communication degradation.

15 Claims, 3 Drawing Sheets

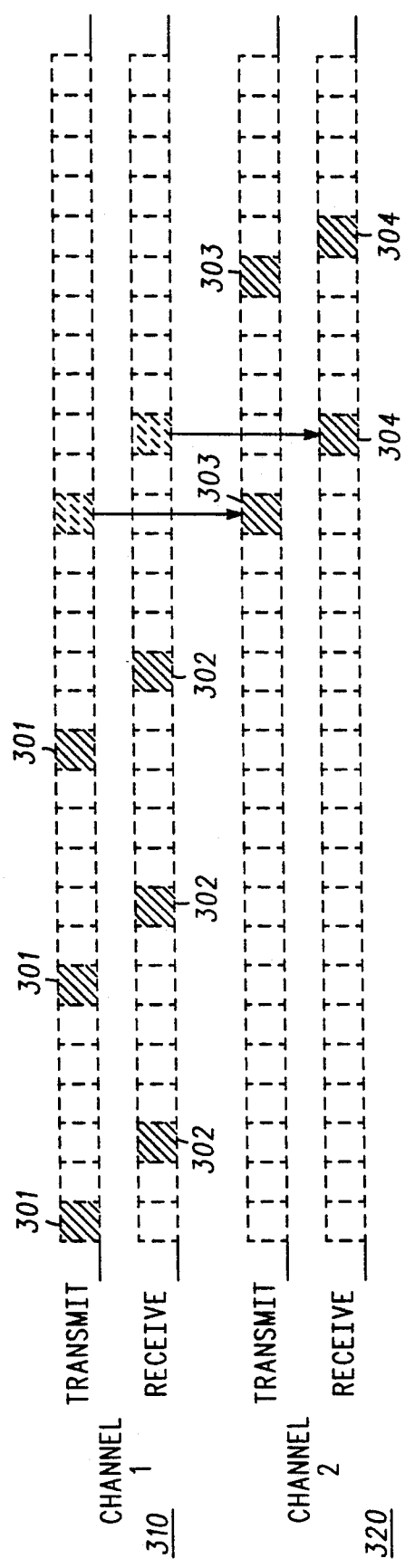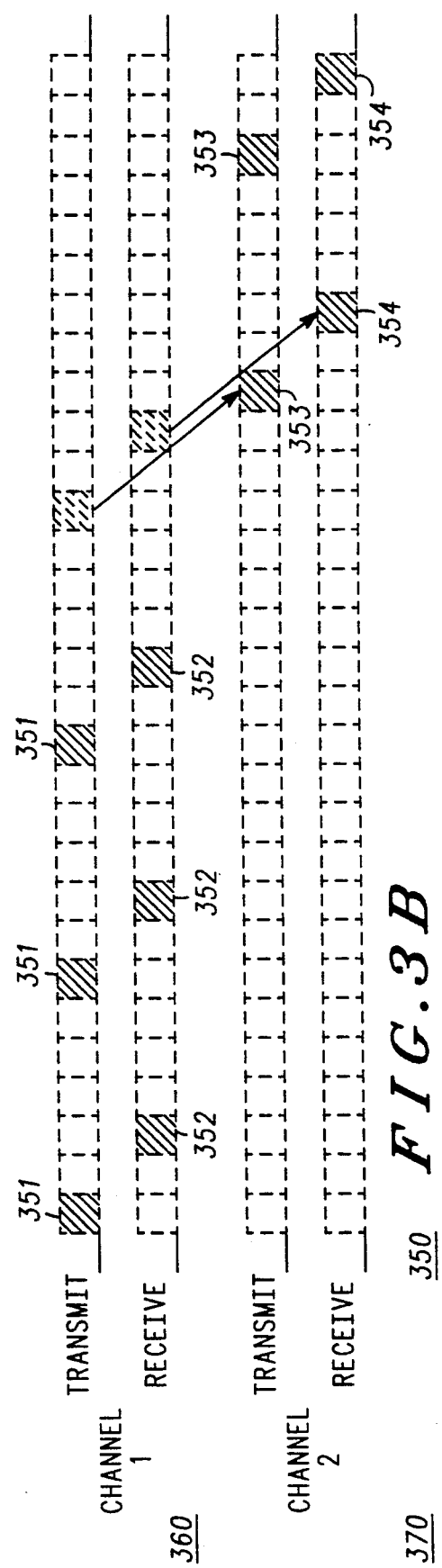

METHOD FOR EFFECTING HANDOFF IN A MULTI-SITE COMMUNICATION SYSTEM

FIELD OF THE INVENTION

This invention relates generally to multi-site Time-Division Multiplex (TDM) communication systems, including but not limited to methodologies that effect handoff of communications between communication sites.

BACKGROUND OF THE INVENTION

Multi-site communication systems are well known. These communication systems provide communication services over a large area by dividing that area into subareas, known as cells, each being serviced by a discrete communication site. These systems require a handoff mechanism in order to provide seamless communication services to mobile communication units moving about the system coverage area. The handoff process switches the base site communication resource associated with a communication in progress from a first cell site to another cell site. Generally, this switch is enacted in response to degrading communication quality associated with the first communication site. This degradation in communication quality may be due to the mobile communication unit traveling too far from the first site, or to other factors affecting RF communication quality.

The general goal of any handoff method is to maximize the quality of service offered to the user at all times during a communication. There are three major factors that affect this quality. One is the inevitable interruption in the communication link as the user switches from the current communication channel to the new communication channel. Another is the signalling that controls the handoff. The final impact factor is the reliability of the new channel assignment; the handoff is of little use if the condition of the newly assigned communication channel is unacceptable, or acceptable for only a very short time.

Many methods for choosing a handoff channel are known. One typical handoff decision method requires the base stations at sites adjacent to the current site to monitor the signal quality of the mobile communication unit. Some methods produce a handoff that is substantially more reliable than other methods. Mobile-assisted handoff schemes are a good example of this, where the mobile communication unit is required to participate in the choice of handoff channels. The resulting handoff is generally more reliable because both the mobile communication unit and the base station are required to check the quality of the proposed handoff. Of course, this method requires the mobile communication unit to report its decision via additional signalling. Methods that act to improve the reliability of the handoff generally result in additional signalling and thus additional call interruption.

The application of handoffs to time division multiplexed (TDM) systems adds a new dimension, time, to the handoff problem. In a TDM system, the communication channel is defined as the combination of an RF frequency and a time slot. The duration of the call interruption for handoff and its requisite control signalling is directly related to the relative timing of the current communication channel (frequency plus time slot) and the new communication channel. Thus the expected call interruption will have a range of values dependent on the time slot corresponding to the chosen handoff channel.

A need exists for a method that better balances handoff methods with respect to these various factors, to attempt to maximize the quality of service to the user.

SUMMARY OF THE INVENTION

Briefly, according to the invention, a method of effecting handoff of a communicating communication unit from a first communication resource to a second communication resource is disclosed herein. After determining that a handoff from the first communication resource to the second communication resource should likely be made, the method selects a handoff methodology that represents an acceptable compromise between handoff reliability on the one hand and communication degradation on the other hand.

In one embodiment, the selection process includes providing a plurality of handoff methodologies (each handoff methodology having a different intrinsic reliability associated with it), and then determining the level of communication degradation that will likely occur if each of the handoff methodologies were used to effect the current handoff. These various levels are then compared against one of more predetermined thresholds to assist in identifying the particular handoff methodology that exhibits an acceptable level of communication degradation in combination with the highest available reliability.

In another embodiment, the levels of likely communication degradation can be determined on a seriatim basis instead, beginning with the most reliable handoff method. Pursuant to this embodiment, if the most reliable method will cause no more than an acceptable level of communication degradation, then that method can be selected for use without requiring additional comparisons or comparisons with other, less reliable methods.

In another embodiment, the threshold (or thresholds) can be varied as a function of some appropriate system parameter. For example, the threshold can be made lower or higher depending upon the need to effectuate handoff soon due to a rapidly deteriorating current communication channel.

BRIEF DESCRIPTION OF THE DRAWINGS

FIGS. 3A and B shows a time line of exemplary handoff circumstances according to the present invention.

DESCRIPTION OF A PREFERRED EMBODIMENT

Figure 1:
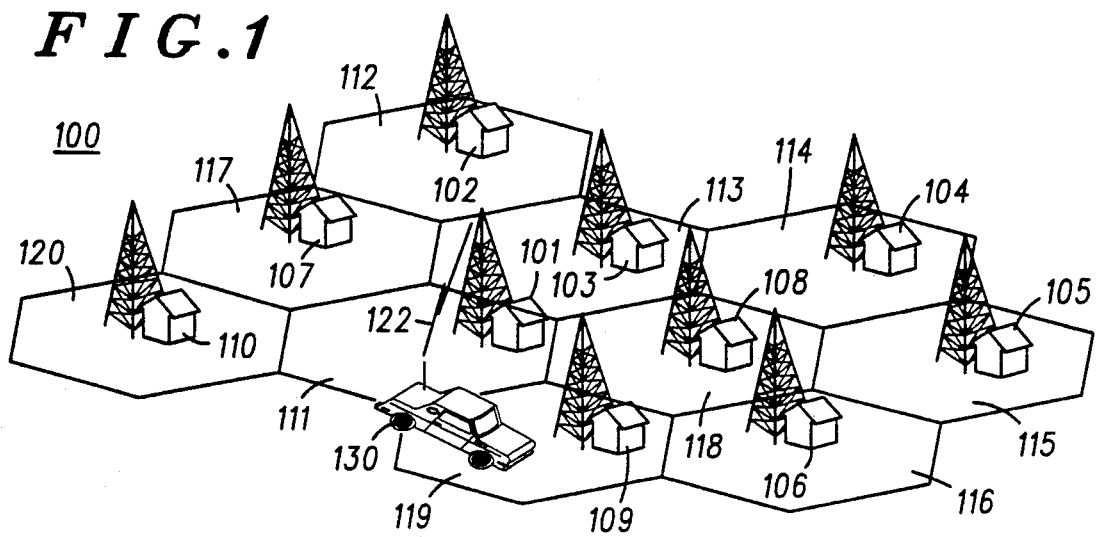
FIG. 1 comprises a block diagram of a multi-site RF communication system utilizing the principles of the present invention.

Referring to FIG. 1, a multi-site RF communication system (100) consists of a plurality of communication sites (101-110) providing communication services in a plurality of communication coverage areas (111-120) and a plurality of mobile subscriber communication units (130) utilizing the communication services provided by the communication system (100). In this context, a communication unit may comprise either a mobile radio communication device, a portable radio communication device, or other appropriate devices. In the preferred embodiment, each communication site is comprised of a plurality of RF transmitters and receivers and site controlling apparatus as appropriate to provide RF communication services to the subscriber communication units (130), as well understood in the art. Generally, to avoid RF interference, the set of radio frequencies in use at a particular communication site is unique as compared to the set of radio frequencies in use in all of the other communication sites (101-110) located within a certain distance of the first communication site. The communication sites (101-110) are further interconnected by a control network not shown in FIG. 1, again as well understood in the art.

In the preferred embodiment, the communication system (100) utilizes time-division multiplexing (TDM). Each radio frequency in use at a communication site (101-110) is divided into repetitive time frames which are further divided into a plurality of time slots. (A "radio frequency" as referred to herein is actually comprised of two 25 kHz frequency bands, one of which is used for transmission from the communication units and one of which is used for reception by the communication units; other arrangements are of course possible.) Communication services are provided to the communication units (130) via the temporary assignment of a communication resource that comprises at least one TDM slot on at least one radio frequency to communicate user information.

In the preferred embodiment of the communication system (100), the primary communication service provided to communication units (130) is voice communications. Using this service, the communication units (130) use RF resources to transmit and receive voice information between themselves or other networks such as the public switched telephone network. Due to the TDM nature of the communication system (100), as understood in the art, voice information is communicated on the communication channels as packets of information. These packets comprise appropriately processed representations of voice information.

Figure 2:
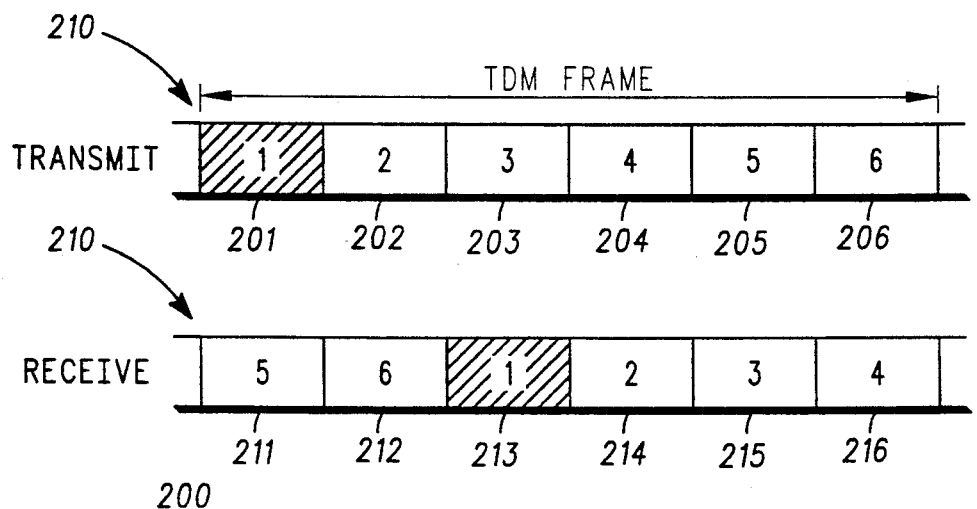
FIG. 2 shows an exemplary RF channel format used in the system of FIG. 1.

Referring to FIG. 2, an exemplary channel format for the TDM communication system (100) is generally depicted by number 200. As shown, the transmit and receive frequencies are divided in time into a continuous series of time frames (210). Each time frame is further subdivided into a plurality of time slots (201-206, 211-216). FIG. 2 further shows a pair of slots (201, 213) that may be assigned to a communication unit (130) for providing communication services. As shown, the arrangement of the transmit and receive slots (201, 213) provides a guard time equal to the duration of one time slot between the end of the transmit time slot (201) and the beginning of the receive time slot (213). This guard time permits the communication unit (130) to switch its antenna and RF circuits from transmit configuration to receive configuration. This operation is referred to in the art as Time Division Duplex (TDD).

Referring back to FIG. 1, a communication unit (130) is depicted as engaged in communication (122) via a particular communication site (101). As the communication unit (130) travels about the area, it may move substantially out of the coverage area of that site (111) and into the coverage area of another communication site (102-110). For example, consider that the communication unit (130) is moving into the coverage area designated by the numeral 119. In order to continue to provide the current communication service to the communication unit (130), the system must dynamically switch the communication channel in use by the communication unit from one at the first communication site (101) to one at the second communication site (109). This process of switching the communication channel in use is referred to as handoff. (It is assumed that a communication channel is available at the second communication site (109). If not, appropriate steps can be undertaken to attempt to maintain communication via the first communication site (101) until a suitable communication channel becomes available at the second communication site (109).)

In the course of a handoff process, there are opportunities for the quality of the communication service being provided to the communication unit (130) to degrade. For voice communications, this degradation can be measured by the amount of voice information that may be lost during the handoff. Handoff generally requires the communication service to be briefly interrupted to facilitate such actions as control signalling and modification of the radio apparatus in accordance with the new communication channel. Voice information must generally be lost during these interruptions. In the preferred embodiment of the invention, interruptions due to control signalling, candidate channel analysis, and the handoff itself are all relevant, and each cause will now be described in more detail.

The first source of interruption is the signalling that must take place between the communication site (101) and the communication unit (130). This signalling is used to communicate information about the impending handoff, such as identification of the candidate handoff channel, or signal quality information. After determining that a handoff is required, a candidate handoff channel is determined via well known methods. This candidate handoff channel is the channel in the second communication site (109) to which the communication unit (130) should be handed off to in order to continue communications. The signalling exchanges then act to communicate and possibly verify the choice of a candidate handoff channel.

In the preferred embodiment of the communication system (100), two types of handoff decisions are available. These are base determined handoff and mobile assisted handoff. In base determined handoff, the first and second communication sites coordinate to choose a candidate handoff channel which is communicated via signalling to the communication unit (130). The communication unit has no input into this decision process. The initial steps of mobile assisted handoff are identical to that of base determined handoff. However, after the candidate handoff channel is communicated to the communication unit, the communication unit is required to verify the channel selection by briefly measuring the signal quality of the candidate handoff channel and indicating its acceptance of the channel choice via additional signalling. Hence, in general the mobile assisted method provides a more reliable handoff decision, but also requires more signalling. In the preferred embodiment of the communication system (100), handoff signalling information is transmitted by replacing the voice information that would normally be transmitted in the assigned TDM slot. Thus the amount of signalling related to a handoff method contributes to one source of communication degradation experienced by the user of the communication unit.

When the mobile assisted handoff decision method is used, additional communication degradation may result from the measurement of signal quality on the candidate handoff channel by the communication unit. In one embodiment, the communication unit would measure the talkout quality of the candidate handoff channel while briefly receiving the candidate handoff channel. Depending on the relative timing between the TDM slot associated with the candidate handoff channel and the TDM slot associated with the current communication channel, the communication unit may be required to interrupt transmitting or receiving on the current communication channel to complete the measurement of the candidate handoff channel. This may occur when the TDM slot associated with the candidate handoff channel is coincident with the current transmit or receive TDM slot because, in the preferred embodiment of the communication unit, the communication unit (130) has only a single transceiver which is not capable of RF duplex. Recall that in general the current communication channel and the candidate handoff channel will utilize distinct RF frequencies. Since the receiver portion of the communication unit (130) must therefore modify its receive frequency to measure the signal quality of the candidate handoff channel, the communication degradation will also depend on the time required for the communication unit to modify its receive frequency. This time is referred to as the synthesizer delay, the value of which for each communication unit will generally be known to the communication system (100). Thus the communication degradation attributable to the measurement of the candidate handoff channel will depend on the choice of the candidate handoff channel and will be substantially different for each potential handoff. Once the candidate handoff channel is determined, the degradation can be predicted based on the known timing relationship between the TDM slot associated with the candidate handoff channel and the TDM slot associated with the current communication channel.

The final contributor to handoff communication degradation is the handoff itself. Referring to FIG. 3A, one possible handoff scenario is depicted by numeral 300. The communication unit (130) is assigned a single pair of TDM slots (301, 302) on the current communication channel (310). The handoff channel is composed of a substantially similar pair of TDM slots (303, 304) on a second communication channel (320). In this scenario, the handoff channel is substantially coincident in time with the current communication channel. Thus the handoff could be achieved with no loss of user information. Referring to FIG. 3B, a different scenario is depicted by numeral 350. As in the scenario of FIG. 3A, the communication unit (130) is assigned a single pair of TDM slots (351, 352) on the current communication channel (360), and the handoff channel is composed of a substantially similar pair of TDM slots (353, 354) on a second communication channel (370). In this case, however, the handoff channel is delayed by three time slots relative to the current communication channel. The user voice information corresponding to this delay represents a loss of user information and resulting communication degradation. Thus the communication degradation attributable to the handoff will depend on the choice of the candidate handoff channel and will be substantially different for each potential handoff. Once the candidate handoff channel is determined, the degradation can be predicted based on the known timing relationship between the TDM slot associated with the candidate handoff channel and the TDM slot associated with the current communication channel.

Figure 4:
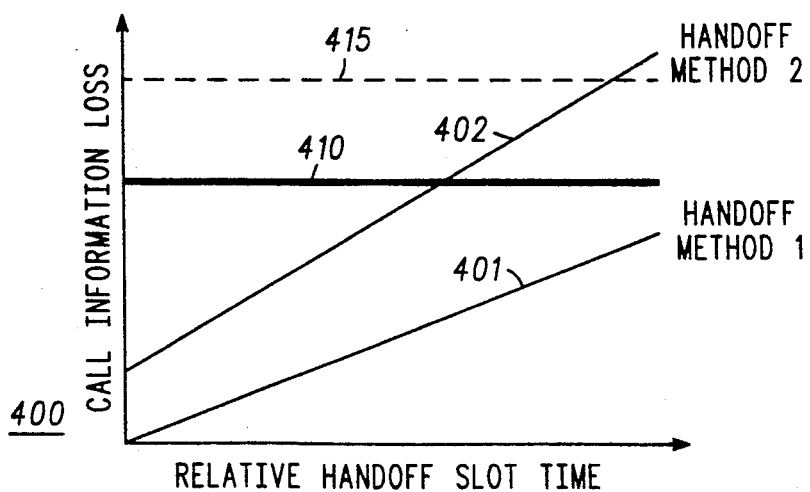
FIG. 4 is a graph demonstrating the relationship of handoff slot timing and communication degradation according to the present invention.

Accordingly, the communication degradation experienced by the communication unit (130) during a handoff is at least related to the choice of handoff decision methods and the choice of candidate handoff channels. Referring to FIG. 4, this relationship is depicted by the graph (400) of Relative Handoff Slot Time versus Call Information Loss. The degradation for two handoff methods is shown by the two graph lines (401, 402). Handoff Method 1 (401) refers to the base determined method and Handoff Method 2 (402) refers to the mobile assisted method. Note that Handoff Method 2 generally results in greater loss but also produces a generally more reliable handoff. In the preferred embodiment of the communication system (100), at least one threshold of acceptable loss (410) is chosen. As shown in FIG. 4, some handoffs could satisfy the limit with either method, while some handoffs would only be acceptable using Handoff Method 1.

According to this embodiment, the most reliable method that satisfies the loss threshold would be chosen for each handoff.

Figure 5:
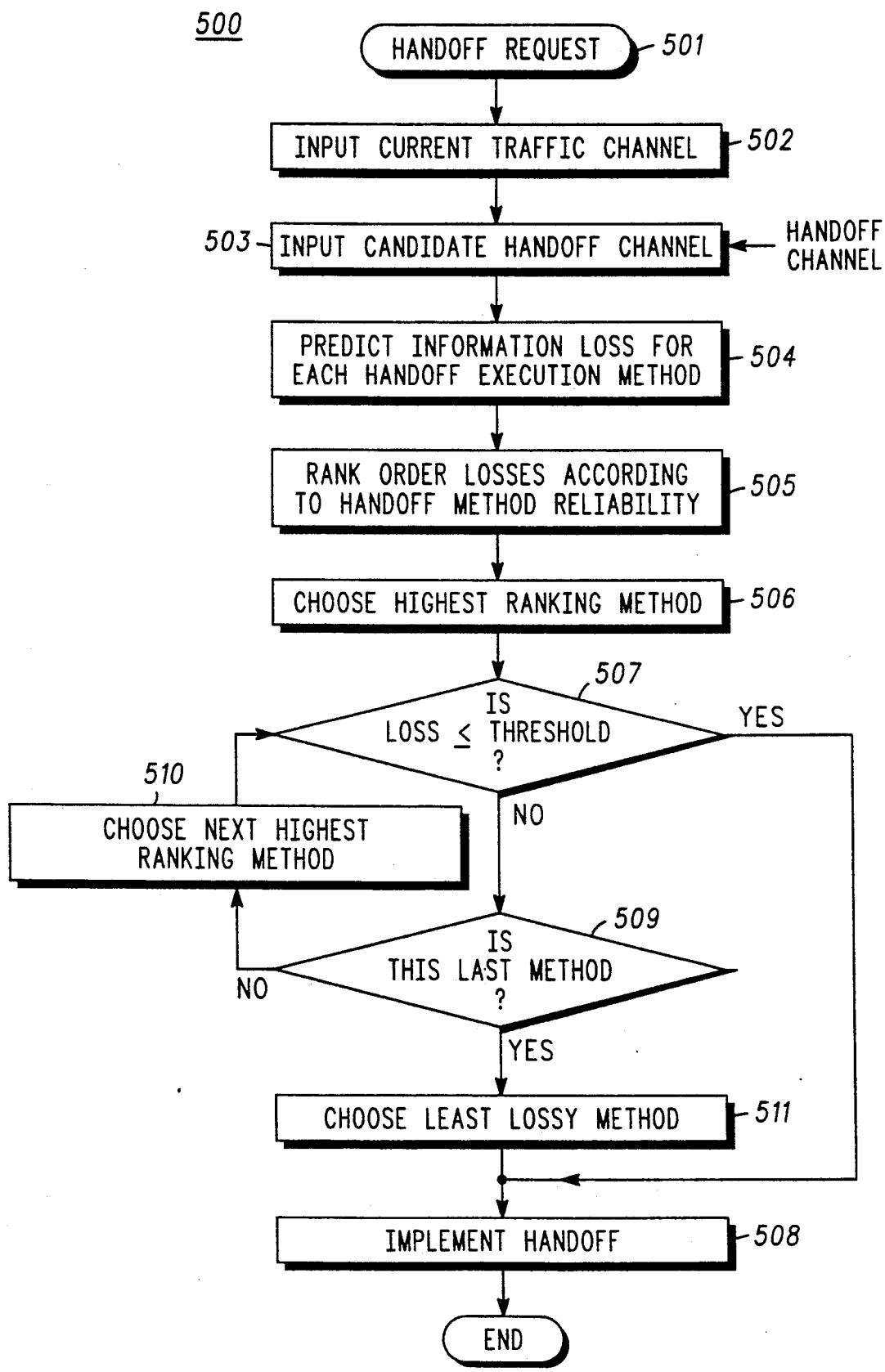
FIG. 5 is an operation flow chart of a handoff control method according to the present invention.

Referring to FIG. 5, the operation of the system in accordance with the invention is described in conjunction with the flow chart (500). The process begins with the determination that a handoff is desired (501) (this step could include, for example, a determination that the level of current communication quality has degraded). The current communication channel and the candidate handoff channel are determined in blocks 502 and 503. In block 504, the resulting information loss is predicted for each of the available handoff execution methods. The methods and their predicted losses are then rank ordered according to the estimated reliability of each method in block 505. The highest ranking method, i.e. most reliable, is chosen in block 506. In block 507, the loss predicted for this method is compared with the threshold to ascertain which method has a level of communication degradation having a predetermined relationship with respect to the threshold. For example, if the predicted loss is less than the acceptable threshold, the handoff is executed using this method in block 508. If the predicted loss is in excess of the threshold, a determination is made in block 509 if there are any other methods available. If this is not the last available method, the next method in the rank ordered list is chosen in block 510. This method is then subjected to the threshold test of block 507. This process continues until a handoff execution method is found that satisfies the threshold or until all of the methods have been considered. If all methods result in a loss in excess of the threshold, the least lossy method is chosen in block 511. This method is then used to execute the handoff in block 508. This preferred embodiment therefore acts to execute a handoff with a method that provides the most reliability with acceptable loss or with the least loss.

Alternative embodiments of the invention include a hard loss threshold (415, FIG. 4) wherein a handoff that exceeded the threshold would not be allowed. In this case the process would simply terminate if an acceptably lossy method was not available. If, on the other hand, at least one of the handoff methods does exhibit an acceptable relationship with respect to the hard loss threshold (415), the comparisons set forth above with respect to the first threshold (410) can then be carried out to identify the best handoff method for use at that particular time. In a further embodiment, the threshold may be modified according to the relative need for a handoff. As the signal quality of the current communication channel degraded, a higher loss threshold may be set to enable a previously unacceptable handoff. In another embodiment, each handoff execution method may be assigned a separate threshold wherein each threshold is determined with regard to the reliability of the method. In yet another embodiment, the predicted losses may be used to recursively choose from a plurality of available candidate handoff channels with substantially similar quality levels.

Accordingly, the present invention operates to choose a handoff execution method that provides maximum handoff reliability while maintaining acceptable information losses and minimal communication degradation.

What is claimed is:

1. A method of effecting handoff of a communicating communication unit from a first communication resource to a second communication resource, comprising the steps of:
   A) determining that a handoff from the first communication resource to the second communication resource should likely be made;
   B) determining a level of communication degradation that will likely occur if handoff occurs to the second communication resource pursuant to a first handoff methodology;
   C) determining a level of communication degradation that will likely occur if handoff occurs to the second communication resource pursuant to at least a second handoff methodology, which second handoff methodology is different than the first handoff methodology;
   D) selecting one of the handoff methodologies as a function of:
      i) likely reliability; and
      ii) acceptable communication degradation to provide a selected handoff methodology.

2. The method of claim 1, and further including the step of:
   E) using the selected handoff methodology to handoff the communicating communication unit from the first communication resource to the second communication resource.

3. The method of claim 1, wherein the step of selecting one of the handoff methodologies as a function of acceptable communication degradation includes the step of comparing the level of communication degradation that will likely occur if handoff occurs with the handoff methodologies against at least one threshold value representing an unacceptable level of communication degradation.

4. The method of claim 1, wherein the first and second communication resources each comprise a radio frequency channel.

5. The method of claim 4, wherein each of the radio frequency channels includes a least one predetermined frequency having a predetermined bandwidth.

6. The method of claim 5, wherein each of the radio frequency channels are time division multiplexed to provide a plurality of time slots.

7. The method of claim 6, wherein the steps of determining a level of communication degradation that will likely occur if handoff occurs to the second communication resource pursuant to a first handoff methodology and determining a level of communication degradation that will likely occur if handoff occurs to the second communication resource pursuant to a second handoff methodology each include the step of considering likely time slot assignments for the second communication resource with respect to time slot assignments for the first communication resource.

8. The method of claim 3, wherein:
   the step of determining that a handoff from the first communication resource to the second communication resource should likely be made includes the step of determining a level of current communication degradation for the first communication resource; and
   the step of comparing the level of communication degradation that will likely occur if handoff occurs with the handoff methodologies against at least one threshold value includes the step of selecting the at least one threshold value as a function, at least in part, of the level of current communication degradation for the first communication resource.

9. A method of effecting handoff of a communicating communication unit from a first communication resource to a second communication resource, comprising the steps of:
   A) determining that a handoff from the first communication resource to the second communication resource should likely be made;
   B) determining a level of communication degradation that will likely occur if handoff occurs to the second communication resource pursuant to a first handoff methodology;
   C) comparing the level of communication degradation with a predetermined threshold;
   D) when a first predetermined relationship exists between the level of communication degradation and the predetermined threshold, using the first handoff methodology to effect the handoff;
   E) when a second predetermined relationship exists between the level of communication degradation and the predetermined threshold:
      i) determining a new level of communication degradation that will likely occur if handoff occurs to the second communication resource pursuant to a second handoff methodology;
      ii) comparing the new level of communication degradation with the predetermined threshold;
      iii) when the first predetermined relationship exists between the new level of communication degradation and the predetermined threshold, using the second handoff methodology to effect the handoff.

10. The method of claim 9, wherein:
    the step of determining that a handoff from the first communication resource to the second communication resource should likely be made includes the step of determining a level of current communication degradation for the first communication resource; and
    the predetermined threshold is selected as a function, at least in part, of the level of current communication degradation for the first communication resource.

11. A method of effecting handoff of a communicating communication unit from a first communication resource to a second communication resource, comprising the steps of:

A) determining that a handoff from the first communication resource to the second communication resource should likely be made;

B) determining a level of communication degradation that will likely occur if handoff occurs to the second communication resource pursuant to a first handoff methodology;

C) comparing the level of communication degradation with a plurality of predetermined thresholds;

D) when a first predetermined relationship exists between the level of communication degradation and the plurality of predetermined thresholds, using the first handoff methodology to effect the handoff;

E) when a second predetermined relationship exists between the level of communication degradation and the plurality of predetermined thresholds:
  i) determining a new level of communication degradation that will likely occur if handoff occurs to the second communication resource pursuant to a second handoff methodology;
  ii) comparing the new level of communication degradation with the plurality of predetermined thresholds;
  iii) when the first predetermined relationship exists between the new level of communication degradation and the plurality of predetermined thresholds, using the second handoff methodology to effect the handoff.

12. The method of claim 9, wherein:
the step of determining that a handoff from the first communication resource to the second communication resource should likely be made includes the step of determining a level of current communication degradation for the first communication resource; and
at least some of the plurality of predetermined thresholds are selected as a function, at least in part, of the level of current communication degradation for the first communication resource.

13. A method of effecting handoff of a communicating communication unit from a first communication resource to a second communication resource, comprising the steps of:
  A) providing at least a first and a second handoff methodology for use in effecting the hand off, wherein the first handoff methodology comprises a more reliable handoff methodology than the second handoff methodology;
  B) determining that a handoff from the first communication resource to the second communication resource should likely be made;
  C) determining a level of communication degradation that will likely occur if handoff occurs to the second communication resource using the first handoff methodology;
  D) comparing the level of communication degradation with at least one predetermined threshold;
  E) when a first predetermined relationship exists between the level of communication degradation and the at least one predetermined threshold, using the first handoff methodology to effect the handoff;
  F) when the first predetermined relationship does not exist between the level of communication degradation and the at least one predetermined threshold, determining whether the second handoff methodology should be used to effect the handoff.

14. The method of claim 13, wherein the first handoff methodology requires a greater exchange of control signalling than the second handoff methodology.

15. The method of claim 14, wherein the first handoff methodology requires the communicating communication unit to test a candidate second communication resource.

* * * * *